United States Patent [19]

Fabris et al.

[11] 4,061,845

[45] Dec. 6, 1977

[54] COPOLYMERS OF HYDRAZIDES AND CERTAIN UNSATURATED ESTERS

[75] Inventors: Hubert J. Fabris, Akron; David P. Gruber, Cuyahoga Falls; David R. Sponseller, Akron; Heinz Uelzmann, Tallmadge, all of Ohio

[73] Assignee: The General Tire & Rubber Company, Akron, Ohio

[21] Appl. No.: 738,775

[22] Filed: Nov. 4, 1976

[51] Int. Cl.[2] .................... C08G 67/00; C08G 69/00; C08G 18/10

[52] U.S. Cl. .................... 526/11.1; 156/331; 260/77.5 CR; 260/77.5 AT; 260/77.5 AM; 260/842; 260/844; 260/851; 526/23; 526/51; 526/75

[58] Field of Search .................... 526/11.1, 23, 51

[56] References Cited

U.S. PATENT DOCUMENTS

| | | | |
|---|---|---|---|
| 2,761,857 | 9/1956 | Barnhart et al. | 526/51 |
| 3,194,797 | 7/1965 | Caldwell et al. | 526/51 |
| 3,514,429 | 5/1970 | Stahmann et al. | 526/11.1 |
| 3,576,908 | 4/1971 | Brack | 526/51 |
| 3,734,885 | 5/1973 | Muller et al. | 260/45.75 N |
| 3,748,312 | 7/1973 | Burns et al. | 526/11.1 |

*Primary Examiner*—Herbert J. Lilling

[57] ABSTRACT

Novel products can be prepared by reaction of monohydrazides and/or polyhydrazides, in particular dihydrazides, with mono-, di- or, poly-acrylyl compounds. The reactants can be chosen such that the resulting polymers are strictly linear as in the case of reaction of a monohydrazide with a diacrylyl compound as follows:

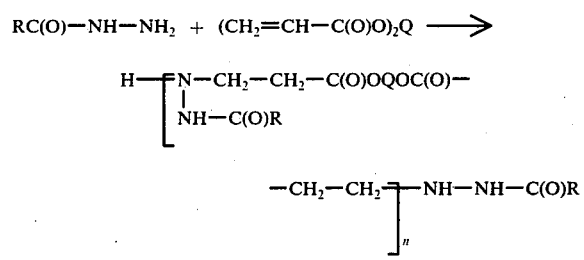

wherein each (O) is a carbonyl oxygen, n is a positive integer, each R is hydrogen or a monovalent group, and each Q is an organic group, R and Q being free of functions which would interfere with the desired reaction at 80° C. Various degrees of crosslinking can be achieved by reacting monohydrazides with components containing an average of more than two acrylate double bonds per molecule or by reacting di-hydrazides with di- or poly-acrylyl compounds.

Fumaric, maleic and itaconic esters and acid esters add to hydrazides in a similar fashion as acrylates, the aliphatic double bond being similarly activated by the carbonyl group. However, methacrylates are totally inert to hydrazide at 80° C.

These reaction products or polymers are useful as exterior or protective and decorative coating materials for bonderized steel and the like. Their impact resistance can be improved by reaction with toughening agents.

10 Claims, 1 Drawing Figure

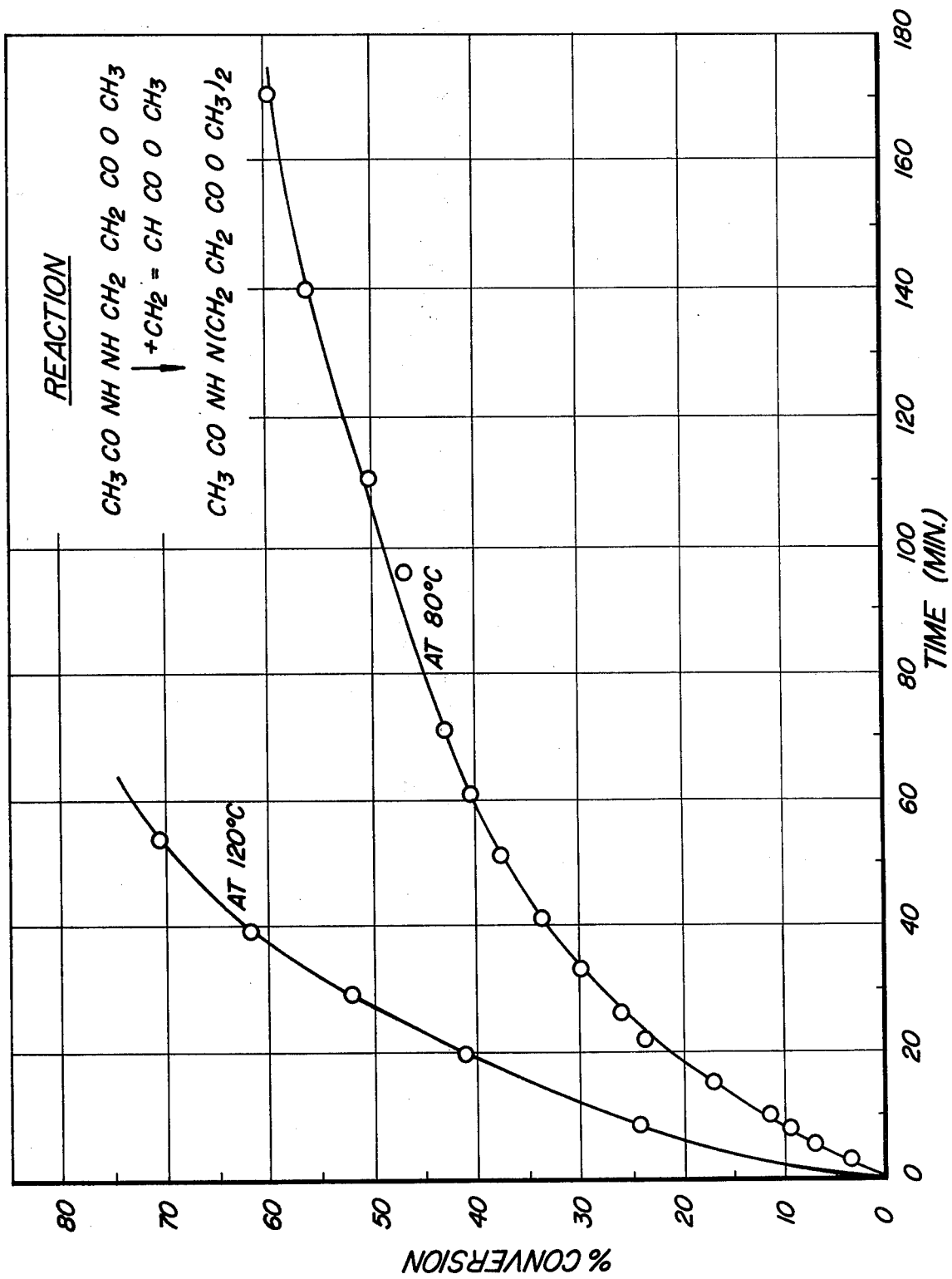

COPOLYMERS OF HYDRAZIDES AND CERTAIN UNSATURATED ESTERS

BACKGROUND OF THE INVENTION

The addition of carboxylic hydrazides (e.g., benzoylhydrazide) to the C = C bond of acrylonitrile was reported by Ebnother et al (Helv. 42, 553 (1959)). The reaction proceeds rapidly, even in the absence of catalysts, and produces N-benzoyl-N'-B-cyanoethylhydrazine in high yields. No disclosure is made of the further reaction of this material to make high molecular weight rubbery, thermoplastic or thermosetting products. Hydrazides are suggested as curing agents for epoxy resins ("Encyclopedia Of Polymer Science And Technology," Vol. 6, 1967, John Wiley & Sons, Inc., page 235). Polyhydrazides have been prepared by reacting hydrazine hydrate with a polyester to provide side chains of hydrazide groups. Linear polyhydrazides have been formed by heating arylene or alkylene diesters with 1,6-dihydrazinohexane ($NH_2NH(CH_2)_6NHNH_2$). Still other polyhydrazides have been prepared by reacting a diester, a diacyl dichloride or a dibasic acid with hydrazine or a dihydrazide in solvent ("Encyclopedia Of Polymer Science And Technology," Vol. 11, 1969, John Wiley & Sons, Inc., pages 169-175, 183, 184, and 187).

An object of this invention is to provide novel reaction produces of hydrazides and activated unsaturated esters. Another object is to provide novel polymeric reaction products of hydrazides and activated unsaturated ester compounds with or without reactive melamine, urea or phenol-formaldehyde resins, such products being useful as coating materials, adhesives, potting compounds or the like. A further object is to provide such products exhibiting improved impact resistance. Yet another object of this invention is to provide substrates with adherent polymeric coatings of such hydrazide-unsaturated ester reaction products. Still another object is to provide laminates in which the adhesive bonding layers of the laminates together is such a reaction product. These and other objects and advantages of the present invention will become more apparent to those skilled in the art from the following detailed description, the working examples, and the accompanying drawing (Example 3, infra).

SUMMARY OF THE INVENTION

According to the present invention it has been found that hard or flexible polymeric compositions useful as coatings, adhesives, potting or casting compounds can be prepared by copolymerizing or reacting together (in solid form, or in aqueous or organic diluents or solvents) a mixture of A. a hydrazide having the formula $R(C(O)-NH-NHR')_2$ where a is a number from 1 to 10, each (0) is a carbonyl oxygen atom and R is —R', —OR', —$NR_2'$, —NHNHR', —C(O)NHNHR' or a polyvalent organic radical having a molecular weight of from 14 to 15,000, each R' being —H or a monovalent organic radical having a molecular weight of from 15 to 450 and being free of functions which react with methyl acrylate at 80° C., and B. an unsaturated organic ester selected from the group consisting of acrylates, fumarates, maleates, and itaconates having from 1 to 5 aliphatic double bonds activated by carbonyl groups and a molecular weight of from about 71 to 12,000, the average number of said carbonyl-activated double bonds being greater than one, said reaction of (A) and (B) involving the addition of at least one hydrogen-containing nitrogen atom in (A) to at least one carbonyl-activated aliphatic double bond in (B).

In general the hydrazide (A) and unsaturated ester (B) are reacted together in the desired mol ratios to give the desired crosslinking or chain extension dependent on the number of hydrazide groups present in the hydrazide, the number of active hydrogen atoms in each hydrazide group, and the number of activated double bonds in the ester. Preferably, a is no greater than 2 and each R' attached to a hydrazide nitrogen atom is —H. The average double bond functionality must be greater than 1 and is preferably at least 2.

Tough, hard coatings are obtained by using blends of from about 5 to 50% by weight of the defined ester having an equivalent weight of at least 300 per activated double bond with from about 50 to 95% by weight of the defined ester having an equivalent weight of less than about 300 per activated double bond reacted with the acid hydrazide. If only high molecular weight ester compounds are reacted with the hydrazides, felixble soft coatings will be obtained. Reactive melamine, urea or phenol-aldehyde resins or mixtures thereof can be added to the polymerization mixture in amounts up to 70, preferably no more than 50, weight percent of the total mixture to improve solvent resistance and hardness. Thus, ester compounds having an equivalent weight of greater than about 300 per double bond can act as toughening agents for such melamine, urea and phenol-aldehyde when cocured with the hydrazides.

These polymers or polymeric compositions can be prepared in bulk, in water, or in an organic volatile inert diluent and/or solvent in any amount dictated by the particular end application. Preferably the amount of water, solvent and/or diluent used in the total composition is maintained as low as possible and in many cases is less than about 30% by weight of the total composition.

DESCRIPTION OF THE PREFERRED EMBODIMENTS

Hydrazides are well known and are prepared preferably by the reaction of a carboxylic acid ester and hydrazine. For example, $CH_3C(O)OC_2H_5$ + $H_2N-NH_2 \rightarrow CH_3C(O)NH-NH_2$ (acetyl or acethydrazide + $C_2H_5OH$ (Fieser and Fieser, "Organic Chemistry," D.C. Heath and Company, Boston, 1944, pages 184 and 234). Obviously, the carboxylic acid ester must be free of activated double bonds.

The hydrazides used in the practice of this invention have the general formula $R(C(0)-NH-NHR')_a$ as defined above. When R and/or R' are organic, they are preferably saturated or unsaturated hydrocarbon groups which can be aliphatic, cycloaliphatic or aromatic and which do not contain carbonyl-activated aliphatic double bonds. Such hydrocarbon groups can contain halogen atoms and/or hydroxy, amide, carboxy, ether, thioether, nitrile and/or ester groups and the like. These hydrazides are typically the hydrazine reaction products of the methyl, ethyl, propyl or other alkyl ester of an aliphatic monocarboxylic acid, e.g. carbamic-, acetic-, propionic-, butyric-, 2-ethylhexanoic-, palmitic-, stearic-, oleic-, linoleic-, linolenic-, naphthenic-, and phenylacetic acids; or of an aromatic, condensed aromatic or substituted aromatic carboxylic acid, e.g., benzoic acid or its derivatives carrying one or more substituents on the aromatic ring, e.g. hydroxybenzoic acids, halo-benzoic acids, alkyl-benzoic acids such as toluic acid, ethyl benzoic acid or other alkyl-substituted benzoic acid, or naphthoic acid and the like and mixtures of the same.

The alkyl esters of dibasic acids can also be reacted with hydrazine to produce hydrazides. Examples of such dibasic acids are: carbonic-, oxalic-, glutaric-, adipic-, sebacic-, azelaic-, pimelic-, trimethyladipic-, phenylenediacetic-, or benzene dicarboxylic acids (e.g. isophthalic and terephthalic acids) as well as their derivatives such as, for example, monoesters or monoamides. Alkyl esters of 1,3-cyclohexane dicarboxylic acid or trimellitic acid also can be used.

Other hydrazides can be prepared by the reaction of hydrazine with carboxyl-terminated polymers and copolymers of dienes such as butadiene and/or isoprene, or with copolymerized styrene and its derivatives. These polymers can be made by anionic polymerization using an alkyl lithium catalyst or a dilithioisoprene catalyst followed by treatment with $CO_2$, hydrolysis to form COOH end groups and esterification with alchols prior to reaction with hydrazine to form the corresponding hydrazides. Still other addition polymers can be used such as the solution or emulsion polymers of acrylic acid, methacrylic acid, maleic, fumaric and/or itaconic acids and/or their derivatives, or of the copolymers of these monomers with butadiene, styrene, acrylonitrile and so forth. They can be reacted directly with hydrazine if esterified, or in the case of the free acid containing polymers, reacted with hydrazine after esterification.

Thus, the hydrazides of the present invention have the general formula $R(C(O)-NH-NHR')_a$, preferably $R(C(O)-NH-NH_2)a$, where R, R' and a are the same as defined above. Mixtures of these hydrazides can be used.

The unsaturated organic ester compounds useful in the practice of the present invention preferably have the general formula $Q(E)_b$ in which Q is an organic group having a valence of b, each E is an unsaturated ester group containing one or more carbonyl-activated aliphatic double bonds and b is a number from one to 5, the total of carbonyl-activated aliphatic bonds in any single compound being in the range of 1 to 5.

The Q group is preferably a saturated or unsaturated hydrocarbon group which can be aliphatic, cycloaliphatic or aromatic and which does not contain E groups or hydrazide groups $-C(O)NHNHR'$. Such hydrocarbon groups can also contain halogen atoms and/or hydroxy, amide, carboxy, ether, thioether, nitrile and/or ester groups and the like. The E groups are preferably selected from acrylates, fumarates, maleates and itaconates free of free carboxyl groups although up to about 10 mol per cent of such fumarates maleates or itaconates can contain such free carboxyl groups which are so weak as to be substantially unreactive with the weak hydrazide bases.

Typical unsaturated organic ester compounds are obtained by reacting acrylic, maleic, fumaric, or itaconic acid, or their esters, with polyols such as glycols, triols, tetrols and pentols, e.g., neopentylene glycol, ethylene glycol, propane diols, butane diols, hexane diols, di-, tri-, and tetra ethylene ether glycols, di-, tri, and tetra propylene ether diols and other polyether polyols, trimethylol propane, hexanetriol, pentaerythritol and the alkylene oxide adducts of these polyols to obtain di-, tri-, tetra- and other polyunsaturated esters.

The esters can be prepared by other methods. For example, maleic or fumaric acid or their derivatives can be reacted with aliphatic or aromatic aliphatic polyols or epoxides. Examples are polypropylene maleate (e.g., U.S. Pat. No. 3,538,043) or the reaction product of one mole of the diglycidyl ether of bisphenol A with 2 mols of fumaric acid. Also, there can be used for this purpose acrylate-, maleate-, fumarate- or itaconateterminated species of higher molecular weight hydroxyl-terminated polyester or polyether diols, triols or tetrols of equivalent weight of 200-3000.

The termination with acrylate groups is best effected either by trans-esterification with methyl or ethyl acrylate or by reaction of an isocyanate-terminated prepolymer of the hydroxyl component with hydroxy alkylacrylates. For example, polypropylene or tetramethylene ether glycol is reacted with tolylene diisocyanate or 4,4'-diisocyanato diphenyl methane and then reacted with hydroxyethyl acrylate or hydroxypropyl acrylate. Maleates and itaconates can be obtained, for example, by reaction of the OH— containing compound with the corresponding cyclic anhydride.

Isocyanate-terminated polymers are well known and can readily be prepared preferably under moisture-free conditions and, if desired, using conventional urethane catalysts. Examples of isocyanates which can be used are the tolylene diisocyanates (TDI), 4,4'-diisocyanato diphenyl methane, 4,4'-diisocyanato dicyclohexyl methane, naphthalene diisocyanate, isocyanates prepared by phosgenation crude aniline-formaldehyde condensation products and mixtures thereof. Preferably, diisocyanates are reacted with polyols such as polytetramethylene ether glycols, polypropylene ether glycols, or other alkylene oxide adducts such as ethylene oxide, propylene oxide, or butylene oxide adducts of glycols, hexanetriol, tri-methylol propane and the like. Other polyols which can be used are the hydroxyl-terminated polypropylene oxideethylene oxide copolymers, butadiene polymers and the like as well as hydroxyl-terminated polyesters obtained from the reaction of a diol and a dicarboxylic acid. The diisocyanate is used in an amount sufficient to provide an isocyanate-terminated urethane prepolymer. The isocyanate-terminated urethane prepolymer is then reacted with sufficient hydroxyl-containing ester, such as a hydroxyalkyl acrylate like hydroxyethyl acrylate, hydroxypropyl acrylate, hydroxybutyl acrylate or mixtures thereof, to provide the high molecular weight isocyanate urethane prepolymer with reactive acrylate groups. Mixtures of these polyesters can be used.

Reactive melamine, urea or phenol-formaldehyde resins can be incorporated into the novel reaction products of this invention by mixture and subsequent reaction with precondensates, e.g. precondensates of urethane-acrylate-hydrazide, or optionally, in certain cases, by addition to the reaction mixture in amounts up to 70 weight percent of the total formulation further to improve hardness and solvent resistance of coatings made with these materials. Melamine-based resins (e.g., hexamethoxymethylmelamine) are preferred because of their superior resistance to heat and UV-discoloration. Compositions containing up to about 50 weight percent of these resins are preferred. It is often desirable to use acidic catalysts to promote the polymerization of certain melamine type resins. Such catalysts are, for example, p-toluene sulfonic acid or the complexes of Lewis acids, such as $BF_3$, with ammonia, amines, or urea.

While the amino resin-forming material used is preferably hexamethoxymethylmelamine, other reaction products of amino compounds with aldehydes can be used. Examples of the materials to be used are urea, ethyleneurea, melamine, benzoguanamine, acetoguanamine, dicyandiamide, aromatic amines and the like reacted with formaldehyde, acetaldehyde or the like. Some of these amino compounds or resin formers give dark-colored products and may not be desirable for some coatings or finishes. These amino resin compounds should be neutral and free of formaldehyde. Mixtures of these amino resins can be used. See "Encyclopedia of Polymer Science and Technology,", Volume 2, 1965, John Wiley & Sons, Inc., pages 1 to 94.

The phenolic resins used are resols made by alkaline catalysis and should be neutralized. The resins are made by the reaction of formaldehyde, para-formaldehyde or other aldehyde or aldehydefurnishing material with phenol, resorcinol, cresols, xylenols, p-tert butyl phenol and p-phenyl phenol and the like. See "Encyclopedia of Polymer Science and Technology," Volume 10, 1969, John Wiley & Sons, Inc., pages 1 to 73. They should have low molecular weights and be substantially linear or non-crosslinked. Mixtures of the phenolic resoles can be used.

The hydrazides of carboxylic acid esters have been found to be high melting materials with poor solubility characteristics in the acrylate component even at elevated temperatures. In certain cases it will therefore be of advantage to pre-react the hydrazide with the ester component in such an equivalent ratio that the final product still contains active -NH groups for further reaction with additional double bonds. These precondensation products generally are lower melting and have compatibilities with the unsaturated co-reactants which are greatly improved over the parent dihydrazide. For example, good coating compositions can be made by precondensation of benzoylhydrazide with acrylate-terminated isocyanate prepolymers or with trimethylol propane triacrylate. These compounds then can be reacted at elevated temperature with more acrylate and/or an acrylyl-terminated prepolymer and/or a formaldehyde-based resin such as a melamine resin, optionally in the presence of a diluene such as methoxyethanol. These mixtures generally stay liquids at room temperature for extended periods of time. Pot life is from several hours to a day or longer.

Linear high molecular weight polymers are obtained, for example, by reacting substantially equal mols of a hydrazide and a diacrylate:

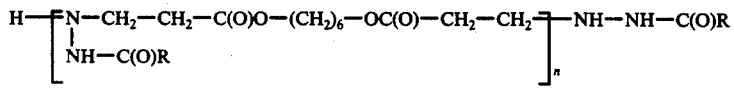

In general, the hydrazide and unsaturated organic ester compounds are reacted together in the calculated mol ratios to give polymers with the desired crosslinking or chain extension dependent on the number of hydrazide groups present in the hydrazide, the number of active hydrogen atoms in each hydrazide group and the number of carbonyl-activated aliphatic double bonds in the ester compound. The polymers are usually prepared by mixing the reactants in the desired stoichiometric ratios (two double bonds per hydrazide group of monohydrazides of one to two double bonds per hydrazide group of a di- or tri-hydrazide) at room temperature either in bulk or in the presence of a sufficient amount of an inert volatile organic diluent or solvent to reduce the viscosity of the mixture to the level suitable for the particular process requirements. Examples of such diluents or solvents are: cellosolves, cellosolve-acetates, halogenated hydrocarbons, esters, ethers, alcohols, methoxy methanol and the like and mixtures thereof.

If the hydrazide is only of limited solubility in the reaction mixtures at ambient temperature, it forms dispersions which are storage stable at 25° C. for at least several days. Cure of the liquid reactive mixture generally requires from about one week at ambient temperature to 1 minute at 200° C., preferably from about 60° to 200° C. for a few minutes to several hours or for a sufficient period of time to cure the copolymer or complete the reaction.

The polymers are useful as protective and decorative, high gloss, low solvent coatings for metals, glass, wood, plastics, fabrics and the like, as adhesive for metals, glass, wood, fabrics and plastics (e.g. polyesterglass fiberstyrene resins) and the like or as casting and potting resins. As adhesives they may be used to bond together two or more layers of the same or different materials.

Acidic catalysts and, in the absence of melamine resins, basic catalysts have been found to be useful for decreasing curing times. Examples of basic catalysts are t-amines or quaternary ammonium bases while p-toluenesulfonic acid is an example of an acid catalyst.

If desired, the usual pigments, flattening agents, antioxidants, antidegradants, fungicides, external platicizers, fillers and the like well known to the coating and decorating arts may be added to the composition of the present invention.

The following examples will serve to illustrate the present invention with more particularity to those skilled in the art. Unless otherwise stated, all quantitative measurements are by weight.

EXAMPLE 1

Preparation of $N^2$-(B-carbomethoxyethyl)acethydrazide

A mixture of 7.5 gm. (0.101 mole) of acethydrazide or acetyl hydrazide and 8.6 gm. (0.1 mole) methylacrylate was heated on a steam bath under reflux for three hours. After stripping volatiles at about 95° C. and 70 mm. Hg, 5.8 gm. (98% of theoretical) of a yellow oil was obtained: $CH_3C(0)NHNHCH_2CH_2C(O)OCH_3$. A portion of this oil (3.8 gm.) was distilled from a "kugelrohr"* at 100 to 140° C. air bath temperature and 0.05 mm. Hg. The colorless oil distillate was characterized by IR, NMR and nitrogen analysis.

$C_6H_{12}N_2O_5$ (160.17):

% N found: 17.74;

% N calculated: 17.6; 6 — R. Graeve and G. H. Wahl, Jr., "Chemical Education," 41, 279 (1964).

EXAMPLE 2

Preparation of N²,N²-di(B-carbomethoxyethyl)acethydrazide

Six and one-half grams of the N²-(B-carbomethoxyethyl)acethydrazide prepared in Example 1 and 10 gm. (0.116 mole) of methylacrylate were heated to reflux on a boiling water bath for eight hours. After stripping volatiles in a vacuum (about 70 mm. Hg pressure) 9.8 gm. (99%) of a yellow viscous oil was obtained which distilled at 95° to 110° C. air bath temperature and less than 0.1 mm. Hg pressure. The pale yellow oil was characterized by IR, NMR and nitrogen analysis and found to be $CH_3C(O)NHN(CH_2CH_2C(O)OCH_3)_2$.

$C_{10}H_{18}N_2O_5$ (246.25): % N found: 12.31: % N calculated: 11.4.

EXAMPLE 3

Determination of Reaction Rates by ¹H-NMR

A. Reaction of Example 1

Acetylhydrazide (0.6 gm., 0.0081 mole) and methylacrylate (0.7 gm., 0.0081 mole) were mixed in an NMR tube and immediately placed in the probe of a Varian A60 Spectrometer which was preheated to the desired temperature. The progress of the reaction was followed by determination of the proton resonance integrals at 3.67 to 3.72 ppm (corresponding to the three protons of CH₃ in the starting actylate + reaction product) and at 2.6 to 3.09 ppm (corresponding to the four protons of —CH₂CH₂— of the reaction product). The conversion was calculated from $$\% \text{ conversion} = \frac{100 \frac{A}{4}}{\frac{A'}{3}}$$

$A$ = Area at 2.6 - 3.09 ppm
$A'$ = Area at 3.67 - 3.72 ppm*

*The proton count at this frequency was to stay constant and was determined to check for possible material losses by volatilization of the methylacrylate-component.

The obtained data are presented in the following table:

TABLE 1

| Time (Min.) | % Conversion at 60° C. | % Conversion at 70° C. | % Conversion at 80° C. |
|---|---|---|---|
| 1 | — | — | 13 |
| 1½ | — | 12 | 18 |
| 2½ | 15 | 18 | 26 |
| 5 | 25 | 32 | 41 |
| 7½ | 30 | 38 | 50 |
| 10 | 34 | 43 | 57 |
| 15 | 43 | 53 | 67 |
| 20 | 47 | 61 | 75 |
| 30 | 58 | 74 | 87 |
| 40 | 68 | 82 | 93 |
| 60 | 80 | 90 | 98 |
| 90 | 88 | 96 | 100 |
| 120 | 96 | 99 | — |
| 195 | 100 | — | — |

B. Reaction of Example 2

1. At 80° C. Equimolar amounts of N²-(B-carbomethoxyethyl) acethydrazide and methylacrylate were placed in a NMR probe as in A. above.

2. At 120° C. The reaction at this temperature was run in a closed vessel immersed in a constant temperature bath. One gram samples for NMR were taken at the indicated time intervals (see above table) with a gas tight syringe via a serum bottle rubber cap. Conversion was calculated according to:

$$\% \text{ conversion} = \frac{(\frac{A}{4} - \frac{A'}{3}) \times 100}{\frac{A}{4}}$$

$A$: area under the resonance peaks at 2.6 and 3.09 ppm corresponding to the protons between the N and the carboxyl groups

$(-N-CH_2CH_2\overset{\overset{O}{\|}}{C}O-)$ and $A'$: Area under the resonance peaks at 1.88 and 1.93 ppm corresponding to the three protons of the acetyl group (CH₃CO). The experimental data are shown in the figure of the accompanying drawing.

EXAMPLE 4

A. Preparation of Trimethyladipic dihydrazide

A mixture of 432 gm. of dimethyl ester of trimethyladipic acid (2 moles) and a solution of 240 gm. hydrazine (95%) in 300 ml. isopropanol was refluxed for 10 hours during which the reactor temperature dropped from an initial temperature of 100° C. to 88° C.

The major part of isopropanol was removed by distillation and the liquid residue left to crystallize in an open dish at ambient temperature overnight. The crystals were washed with cold isopropanol and dried at 40° C. in a vacuum oven. The yield was 270 gm. (62.5% of the theoretical) of the desired product as white crystals of m.p. 125° to 128° C.

B. Preparation of Polyhydrazide

Trimethylolpropane-triacrylate (11.6 gm.), 1,6-hexanedioldiacrylate (11.3 gm.) and 8.64 gm. of trimethyladipic acid dihydrazide were ground together on a micromill until a creamy white, homogeneous-looking liquid was obtained which consisted of a fine dispersion of the dihydrazide in the acrylate mixture. This dispersion was still fluid after two months storage at ambient temperature. A sample of this liquid when spread on a glass plate and heated 15 minutes at 150° C. in an air circulating oven gave a polyhydrazide as a clean, scratch-resistant film with a pencil hardness of 9H+ (Staedtler Pencil Hardness Test, ASTM D-3363-74).

EXAMPLE 5

A mixture of 8.64 gm. trimethyladipic acid dihydrazide, 5.60 gm. of 1,6 hexanediol diacrylate and 5.56 gm. of trimethylolpropane-triacrylate was prepared and cured as in Example 4B. A hard film similar to the one obtained in the previous example was obtained.

EXAMPLE 6

Trimethylolpropane-triacrylate (20 gm.) and 13.6 gm. of benzhydrazide were homogenized two minutes in a micromill. The product at room temperature is a very slow flowing white paste. A sample spread on a glass plate and heated to 155° C. for 15 minutes in an air circulating oven gave a polyhydrazide as a hard, clear film with pencil hardness 3H (Staedtler Pencil Hardness).

EXAMPLE 7

A mixture of 9.9 gm. of trimethylolpropane-triacrylate (0.033 mole) with 7.4 g. (0.1 mole) of acethydrazide was heated for 30 minutes to 75° to 100° C. The obtained adduct of three moles of acethydrazide per mole of triacrylate is a clear solid at room temperature. 1,6-Hexanedioldiacrylate (11.3 gm., 0.1 eq.) was added and the mixture heated to 100° to 110° C. and stirred until a clear homogeneous liquid resulted. A sample of this liquid was heated on a glass plate 30 minutes to 140° C. A clear, crosslinked film was obtained. Pencil hardness: F-HB (Staedtler Pencil Hardness).

EXAMPLE 8

A mixture of 174 gm. of adipic acid dihydrazide (1.0 mole) dispersed in 113 gm. of 1,6-hexanedioldiacrylate (0.5 mole) and 1000 gm. of 2-methoxyethanol was stirred and heated under reflux (125° to 130° C.) for 45 minutes. After ten minutes, the solid dihydrazide had disappeared completely and a clear solution was obtained. Removal of the solvent (methoxyethanol) in a vacuum gave 295 g. of a solid melting at 141° to 145° C.

EXAMPLE 9

Preparation of Acrylate-terminated polyethertriol-TDI prepolymer

Five hundred grams of polypropylene ether triol MW 1000 (Poly G 1030 PG, Olin Chemical Corporation) and 265 g. 80/20 TDI were reacted in a round bottom flask under dry nitrogen for two hours at 110 to 125° C. The flask contents were cooled to about 80° C. and phenothiazine (0.23 gm.) and nitrobenzene (about 0.1 gm.) were added.

Acrylate termination of the isocyanate-terminated prepolymer was achieved by reaction with 201 gm. of hydroxypropylacrylate in the presence of about 0.3 gm. of stannous octoate for one hour at 90° to 100° C. After the stripping of volatiles by heating to 100° C. at 0.5 mm. Hg, the remaining very viscous material was stored in closed glass containers.

EXAMPLE 10

The acrylate-terminated prepolymer of Example 9 (15 gm.), 5 gm. of neopentylene-glycol-diacrylate, 5 gm. of methylethylketone and 5 gm. of the adduct of 2 moles adipic acid dihydrazide and one mole of 1,6-hexanedioldiacrylate (Example 8) were homogenized for 1 minute on a micromill. A film cured on a glass plate at 150° C. for ten minutes was hard and opaque.

EXAMPLE 11

The acrylate-terminated prepolymer of Example 9 (20 gm.) blended with neopentylene-glycol-diacrylate in a weight ratio 3:1 was mixed with 5 gm. of trimethyladipic acid dihydrazide. The mixture was poured into an aluminum dish and heated to 150° C. After 4 to 5 minutes, the mixture gelled. Further heating (30 minutes) gave a clear hard resin which had a Shore D* reading of 65 and which was not attacked by methylethylketone.

*"The Vanderbilt Rubber Handbook," R. T. Vanderbilt Co., N.Y., 1958, page 213.

EXAMPLES 12 and 13

In the following examples, the indicated weights of hydrazide, hexamethoxymethylmelamine (Resimine X-745, Monsanto) and solvent (cellosolve acetate) were ground in a ball-mill for 16 to 20 hours. The resulting milky white mixture (Component A) was then blended with the acrylate component consisting of the acrylate-terminated prepolymer of Example 9 (5.2 pbw, i.e. parts by weight), neopentylene glycol diacrylate (1.8 pbw), trimethylolpropane-triacrylate (5 pbw) and cellosolve acetate (1 pbw) in the ratios given in the table below.

Films of approximately 1 mill thickness were spread on polished Q-metal (plain steel) panels, used for testing by the appliance industry, which had been thoroughly cleaned with acetone until free of contaminants. The coated plates were allowed to cure in a circulating air oven at 150° C. for 30 minutes.

TABLE 2

(Example 12)
EFFECT OF MELAMINE LEVEL ON COATING PERFORMANCE

| COMPONENT A | 1 | 2 | 3 | 4 |
|---|---|---|---|---|
| Benzoylhydrazide (benzhydrazide), pbw | 4.3 | 4.3 | 4.3 | 4.3 |
| Hexamethoxymethyl melamine, pbw | — | 2.2 | 6.2 | 10.0 |
| Cellosolve acetate, pbw | 3.0 | 3.0 | 3.0 | 3.0 |
| COMPONENT B | | | | |
| Acrylate-terminated prepol (Example 9), pbw | 5.2 | 5.2 | 5.2 | 5.2 |
| Neopentyleneglycol diacrylate, pbw | 1.8 | 1.8 | 1.8 | 1.8 |
| Trimethylol propane triacrylate, pbw | 5.0 | 5.0 | 5.0 | 5.0 |
| Cellosolve acetate, pbw | 1.0 | 1.0 | 1.0 | 1.0 |
| Gardner Impact, in lbs. | 160 | 160 | 160 | 60–100 |
| Staedtler Pencil Hardness | 2H | 2H | 2H | 2H |
| Solvent resistance, double-rubs | | | | |
| a. Acetone | 6 | 150 | >200 | >200 |
| b. Toluene | 50 | 100 | <100 | >100 |
| c. Mineral Spirits | >200 | >200 | >200 | >200 |
| NaOH (1% at 71° C.) | Yellow | | No attack→ | |

TABLE 3

(Example 13)
EFFECT OF STOICHIOMETRY ON METAL COATING PROPERTIES

| | A | B | C |
|---|---|---|---|
| COMPONENT A* pbw | 10.8 | 13.5 | 16.2 |
| COMPONENT B** pbw | 9.5 | 9.5 | 9.5 |
| STOICHIOMETRIC RATIO (NH/C = C) | 1.0 | 1.25 | 1.5 |
| MEK RESISTANCE, DOUBLE-RUBS (MEK-METHYLETHYL ketone) | >200 | >200 | 50 |
| GARDNER IMPACT, in lbs. | | | |
| DIRECT | 160 | 60 | 20 |
| REVERSE | 160 | 120 | 140 |
| (test is ASTM D-2794–69) | | | |
| CROSSHATCH, ADHESION (test is ASTM D-3002–71, 81. parallel cut method) | All lines sharp | Two lines chipped | Ten lines chipped |

*Identical to Composition 3 in Table 2 (above). Average equivalent weight: 192g/NH
**Same as Table 2 (above).
Double-rub - cloth soaked in solvent and rubbed against surface coating until rubs through the coating to the base.

EXAMPLE 14

A mixture of hexamethoxymethyl melamine (2.2 pbw), cellosolve acetate (1.0 pbw) and salicylhydrazide (4.7 pbw) was ground on a ball-mill for 20 hours and blended with 13 pbw of Component B of the previous examples (Example 12 and 13). After 30 minutes cure at 150° C., a hard film was obtained (Staedler Pencil Hardness 2H) which is resistant to aliphatic and aromatic solvents. The film, however, totally dissolves after five minutes immersion into 1% aqueous NaOH at 71° C.

EXAMPLE 15

Trimethylolpropane-triacrylate (1.16 pbw), 6.23 pbw of the prepolymer of Example 9 and 2.16 pbw of trimethyladipic acid dihydrazide were thoroughly mixed. The heavy paste was used to bond together 1 inch wide, 3 inch long strips of molded FRP sheet in a crosswise fashion. The sample was cured for 30 minutes at 150° C. After cooling, the sample, when pulled on a "cross-pull tester, " gave an adhesion value of 268 psi. (FRP - thermoset fiberglass-polyester-styrene composition).

EXAMPLE 16

An aromatic fumarate (Atlac 382E, ICI Ind., Ltd.) (10.25 pbw) and trimethyladipic acid dihydrazide (3.60 pbw) were ground on a micro-mill for one minute. The resulting powder has unlimited storage stability. It melts at about 110° C., becomes thermoplastic at 175° C., an thermosets at 190° C. within five minutes to a hard, clear resin. Finally, above 200° C., the polymer degrades.

EXAMPLE 17

The following formulation, mixture of components A and B,

| | | |
|---|---|---|
| Component A | Benzoyl Hydrazide | 19.1% |
| | Resimene X-745 (See Ex. 12 above) | 10.0% |
| | Butyl Cellosolve Acetate | 17.6% |
| Component B | Acrylate-Terminated Prepolymer (Example 9) | 31.1% |
| | Trimethylolpropane triacrylate | 22.2% | was cured at 150° C. for 30 minutes to give hard, high impact coatings on metal which are resistant to aqueous acetic acid (1-3%), to aqueous sodiumhydroxide (1-5%), and to attack by aliphatic solvents such as ketones and mineral spirits. Film softening was observed with aromatic solvents, but on evaporation of the solvent, the film hardened again. Typical film hardness is 2H (Staedtler Pencil Hardness) with 160 inch-pounds Gardner impact (both direct and reverse). Pot life after mixing of the two compounds is greater than 24 hours at room temperature at 24° C.

EXAMPLE 18

A. Preparation of Prereaction product of benzhydrazide and polyacrylyl compounds Benzhydrazide (68 gm.), trimethylolpropane tricrylate (43 gm.), 50 gm. of prepolymer prepared from polypropylene ether glycol (MW 1000, 1 mole), toluene diisocyanate (Isogen 8, 2 moles) and hydroxypropylacrylate (2 moles) and 50 gm. of methoxyethanol were mixed and heated in a round bottom flask to 120° to 122° C., for 30 minutes. A clear, amber liquid was obtained with a viscosity of 8,2000 cps. at 75° C.

B. Coating preparation

Four and 22/100 grams of the reaction product prepared in A. above were mixed with 1.0 gm. of additional trimethylolpropane triacrylate at ambient temperature. A 2-3 mil thick coating on metal was prepared by spreading this final fluid composition on Bonderite steel panels and curing at 150° C. for 15 minutes in an air circulating oven. The cured film had the following properties:

Gardner impact, in lbs.

direct 160
reverse 160
Solvent resistance, Methylethylketone
  double-rub 50
Staedtler Pencil Hardness 3H

EXAMPLE 19

Cure of Prereaction Product of Example 18 with Formaldehyde

The reaction product described in Example 18. (16.88 gm.) is mixed at room temperature with 3.6 gm. of a 38% aqueous solution of formaldehyde. An immediate exothermic reaction raises the temperature to 34° C. A steel panel is coated with the liquid mixture and placed into an air circulating oven maintained at 150° C. A hard, clear, tough film is formed after one minute. The film shows no cracks when the panel is bent 180°.

EXAMPLE 20

Cure of Prereaction Product with Epoxide

The reaction product of Example 19 (1.9 gm.) was mixed with 1.1 gm.of a diglycidylether of tetrapropylene glycol. The fluid mixture is brushed on a tin-coated metal plate and cured in air oven for 20 minutes at 150° C. A clear, hard film was obtained.

EXAMPLE 21 a. Precondensate

One hundred grams (0.1 mole) of polypropyleneether glycol of average molecular weight 1000 (Niax Polyol PPG 1025, Union Carbide) was reacted with 35 g. tolylene diisocyanate under dry nitrogen at 100°-110° C. for 1 hour. The temperature was lowered to 80° C. and 27 g. (0.2 m.) of 2-hydroxy propylacrylate and 7 drops of stannous octoate were added. After the initial slight exotherm had subsided, the temperature was maintained at 100° C. for 30 minutes. Benzhydrazide (27.2 g., 0.2 mole) was dispersed in the reaction-mixture and the temperature raised to 115°-125° C. After 45 minutes, the heating was stopped and 80 g. of isopropanol were added. The viscosity of the product was 17,500 cps. at 25° C.

b. Coating Composition

The above precondensate (55 g.) was mixed with 25 g. of hexamethoxy methyl melamine (Resimene X-745, American Cyanamide Co.) and 8 drops of 33% solution of p-toluene sulfonic acid in methoxy ethanol. The viscosity was ca 950 cps. at 25° C. The clear, glossy film obtained when the liquid was spread on a metal plate and cured at 150° C. for 10 minutes had a hardness of 2H (Staedtler pencil hardness) and Gardner impact 160 in. lbs. Upon storage at room temperature for 6 months, the viscosity of the coating composition had risen to 30,000 cps. at 25° C. and was still spreadable.

We claim:

1. A reactive composition useful in forming polymeric coatings and adhesives and comprising a copolymer of:

a. a hydrazide having the formula R(C(O)—NH—NHR')$_a$ where a is a number from 1 to 10, each (O) is a carbonyl oxygen atoms, R is selected from the group consisting of —R', —OR', —NR'$_2$, —NHNHR', —C(O)NHNHR' and polyvalent organic radicals having molecular weights of from 14 to 15,000, and each R' is a hydrogen atom or a monovalent organic radical having a molecular weight of from 14 to 450 and being free of functions which react with methyl acrylate at 80° C., and b. an unsaturated organic ester having from 1 to 5 aliphatic double bonds activated by a carbonyl group, the average number of said carbonyl-activated double bonds being greater than one, and having a molecular weight of from about 71 to 12,000.

2. A reactive composition according to claim 1 wherein a is no greater than 2, component (b) is selected from the group consisting of acrylates, fumarates, maleates and itaconates, and the average number of said carbonyl-activated double bonds in (b) is at least two.

3. A reactive composition according to claim 2 wherein said hydrazide has the formula $R(C(O)-NH-NH_2)_a$.

4. A reactive composition according to claim 3 wherein (b) is an acrylyl compound and from about 5 to 50% by weight of said acrylyl compound has an equivalent weight of at least about 300 per carbonyl-activated aliphatic double bond and where from about 95 to 50% by weight of said acrylyl compound has an equivalent weight of less than about 300 per carbonyl-activated aliphatic double bond.

5. A reactive composition according to claim 1 dispersed in a dispersant.

6. A copolymer of:
a. a hydrazide having the formula $R(C(O)-NH-NHR')_a$ where a is a number from 1 to 10, each (O) is a carbonyl oxygen atom, R is selected from the group consisting of —R', —OR', —NR', —NHNHR', —C(O)NHNHR', and polyvalent organic radicals having molecular weights of from 14 to 15,000, and each R' is a hydrogen atom or a monovalent organic radical having a molecular weight of from 14 to 450 and being free of functions which react with methyl acrylate at 80° C., and b. an unsaturated oranic ester having from 1 to 5 aliphatic double bonds activated by a carbonyl group, the average number of said carbonyl-activated double bonds being greater than one, and having a molecular weight of from about 71 to 12,000.

7. A copolymer according to claim 6 wherein a is no greater than 2, component (b) is selected from the group consisting of acrylates, fumarates, maleates and itaconates, and the average number of said carbonyl-activated double bonds in (b) is at least two.

8. A copolymer according to claim 7 wherein said hydrazide has the formula $R(C(O)-NH-NH_2)_a$.

9. A copolymer according to claim 8 wherein (b) is an acrylyl compound and from about 5 to 50% by weight of said acrylyl compound has an equivalent weight of at least about 300 per carbonyl-activated aliphatic double bond and where from about 95 to 50% by by weight of said acrylyl compound has an equivalent weight of less than about 300 per carbonyl-activated aliphatic double bond.

10. A copolymer according to claim 6 dispersed in a dispersant.

* * * * *

UNITED STATES PATENT AND TRADEMARK OFFICE
CERTIFICATE OF CORRECTION

PATENT NO. : 4,061,845
DATED : December 6, 1977
INVENTOR(S) : Hubert J. Fabris, David P. Gruber
David R. Sponseller, Heinz Uelzmann It is certified that error appears in the above-identified patent and that said Letters Patent are hereby corrected as shown below:

Claim 6, line 31, column 13, which reads: "-NR'" should read --- $-NR'_2$ ---.

Signed and Sealed this

Fourth Day of December 1979

[SEAL]

Attest:

SIDNEY A. DIAMOND

Attesting Officer

Commissioner of Patents and Trademarks